US012654406B2

(12) United States Patent
Jonuz et al.

(10) Patent No.: US 12,654,406 B2
(45) Date of Patent: Jun. 16, 2026

(54) SYSTEM FOR ASSEMBLING A WIND TURBINE BLADE SHELL

(71) Applicant: LM WIND POWER A/S, Kolding (DK)

(72) Inventors: Haris Jonuz, Kolding (DK); Torben Mikkelsen, Kolding (DK)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/713,156

(22) PCT Filed: Nov. 29, 2022

(86) PCT No.: PCT/EP2022/083629
§ 371 (c)(1),
(2) Date: May 23, 2024

(87) PCT Pub. No.: WO2023/099455
PCT Pub. Date: Jun. 8, 2023

(65) Prior Publication Data
US 2025/0026090 A1     Jan. 23, 2025

(30) Foreign Application Priority Data

Nov. 30, 2021    (EP) ..................................... 21211206

(51) Int. Cl.
*B29C 70/36*          (2006.01)
*B29C 33/26*          (2006.01)
(Continued)

(52) U.S. Cl.
CPC .......... *B29C 70/36* (2013.01); *B29D 99/0028* (2013.01); *F03D 1/0675* (2013.01);
(Continued)

(58) Field of Classification Search
CPC ..... B29L 2031/085; B29C 33/26; Y02P 70/50
See application file for complete search history.

(56) References Cited

U.S. PATENT DOCUMENTS 4,363,687 A * 12/1982 Anderson ............. B29C 70/326
                                                    156/289
9,689,371 B2 * 6/2017 Daenekas ............... B29C 65/48
                        (Continued)

FOREIGN PATENT DOCUMENTS

CN          205951329 U  *  2/2017
DE       202017104848 U1 * 10/2017
                  (Continued)

*Primary Examiner* — Michael W Hotchkiss
(74) *Attorney, Agent, or Firm* — Dority & Manning, P.A.

(57)                ABSTRACT

The present invention relates to a system for assembling a wind turbine blade shell. The system comprises a first support structure comprising a stationary portion and a moveable portion, the moveable portion being adapted to support a first wind turbine blade shell half; a second support structure adapted to support a second wind turbine blade shell half; moving means attached to the moveable portion and configured to move the moveable portion between: i) a first position in which the moveable portion is positioned above the stationary structure, and ii) a second position in which the moveable portion is positioned above the second support structure, wherein when the moveable portion is in the second position, a first wind turbine blade shell half supported by the moveable portion and a second wind turbine blade shell half supported by the second support structure are assembled, forming the wind turbine blade shell.

10 Claims, 9 Drawing Sheets

SECTION A-A

(51) Int. Cl.
　　　*B29D 99/00*　　　(2010.01)
　　　*B29L 31/08*　　　(2006.01)
　　　*F03D 1/06*　　　(2006.01)
(52) U.S. Cl.
　　　CPC ......... *B29C 33/26* (2013.01); *B29L 2031/085*
　　　　　　　　　(2013.01); *F05B 2230/60* (2013.01)

(56)　　　　　　　References Cited

U.S. PATENT DOCUMENTS

| | | | |
|---|---|---|---|
| 9,796,116 B2 * | 10/2017 | Georgs ...................... | B60P 1/28 |
| 2011/0073237 A1 * | 3/2011 | Rajasingam ............ | B29C 33/26 |
| | | | 156/60 |
| 2011/0100542 A1 * | 5/2011 | Faulkner ............... | B29C 66/636 |
| | | | 425/470 |
| 2013/0119582 A1 * | 5/2013 | Schibsbye ............ | B29C 31/006 |
| | | | 425/451.4 |
| 2016/0375631 A1 * | 12/2016 | Encinosa ........... | B29D 99/0014 |
| | | | 156/538 |
| 2017/0266895 A1 * | 9/2017 | Kehlenbeck ............ | B29C 33/26 |
| 2017/0361507 A1 * | 12/2017 | Bendel ............... | B29D 99/0028 |
| 2018/0361677 A1 * | 12/2018 | De Waal Malefijt ... | B29C 65/78 |
| 2020/0156289 A1 * | 5/2020 | With Møller .......... | B29C 33/26 |

FOREIGN PATENT DOCUMENTS

| | | | | |
|---|---|---|---|---|
| EP | 3421209 A1 * | 1/2019 | ............. | B29C 33/00 |
| WO | 2004/043679 A1 | 5/2004 | | |
| WO | 2013/113817 A1 | 8/2013 | | |
| WO | WO-2017009424 A1 * | 1/2017 | ............. | B29C 33/00 |

* cited by examiner

300

SECTION A-A

300

SECTION A-A

300

362

321

363

309

322

302

301

SECTION A-A

300

363    309

362

321

322

302

301

SECTION A-A

300

SECTION A-A

300

SECTION A-A

300

SYSTEM FOR ASSEMBLING A WIND TURBINE BLADE SHELL

This is a National Phase Application filed under 35 U.S.C. 371 as a national stage of PCT/EP2022/083629, filed Nov. 29, 2022, an application claiming the benefit of European Application No. 21211206.4, filed Nov. 30, 2021, the content of each of which is hereby incorporated by reference in its entirety.

FIELD OF THE INVENTION

The present invention relates to a system for assembling a wind turbine blade shell.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Wind turbine blades are usually manufactured by forming two shell halves and assembling them into a complete shell.

Wind turbine blades continue to increase in size, and today many blades exceed 100 meters in length, especially blades used offshore. As the length increases, so does the width of the blades. The manufacturing space requirements increase accordingly, not only in the lengthwise direction, but also in the vertical direction. Tasks such as turning of blade shell halves, requires more and more room as the size of blades increase. Currently, these methods routinely require a clearance 20 meters or even more.

It is therefore desirable to manufacture blades in ways that take up less room than current methods and systems allow.

It is an object of the present invention to provide wind turbine blades in a manner that requires less vertical clearance than current methods for a given blade width. It is also an object to reduce the number of steps from layup of fibre material in a mould to the point at which two wind turbine blade shell halves have been combined into a shell.

SUMMARY OF THE INVENTION

A first aspect of the invention provides a system for assembling a wind turbine blade shell. The system comprises:
- a first support structure comprising a stationary portion and a moveable portion, the moveable portion being adapted to support a first wind turbine blade shell half,
- a second support structure adapted to support a second wind turbine blade shell half,
- moving means attached to the moveable portion and configured to move the moveable portion between:
  - i. a first position in which the moveable portion is positioned above the stationary structure, and
  - ii. a second position in which the moveable portion is positioned above the second support structure, wherein when the moveable portion is in the second position, the first wind turbine blade shell half, when supported by the moveable portion, and the second wind turbine blade shell half, when supported by the second support structure, are assembled, forming the wind turbine blade shell.

The invention provides a support structure separated into at least two portions for supporting the first wind turbine blade shell half. Only the top portion, the moveable portion, is moved when the shell halves are to be assembled to form a complete blade shell. By virtue of this separation of the first support structure into a moveable portion and a stationary portion, the mass to be moved when assembling the two shell halves is significantly reduced. In current systems, the entire support structure supporting one of the shell halves is moved. This requires additional power and equipment. Moving means, such as turning hinges, for rotating the blade shells are expensive, and the reduced mass to be moved may reduce the number of turning hinges needed, which saves costs. In addition, a height of the support structure is easily 10 meters or even higher for blade lengths exceeding 100 meters, which means that when the support structure is moved, such as by pivoting, in prior art systems, the support structure being moved may reach a height of more than 20 meters. Using the present invention, the height needed is essentially on the order of twice the width of the mould, which for large blades is approximately 4-7 meters. In addition, the weight is reduced corresponding to the size of the stationary portion, which remains stationary while the moveable portion is moved during the assembly of the shell halves. Depending on the size and shape of the blade, there may be up to 5 meters of clearance, in some cases more, below parts of the support structure. This space can be used for instance for storage.

In some embodiments, the moveable portion comprises a first mould having a first mould layup surface for manufacturing the first wind turbine blade shell half. With such embodiments, it is possible to use the system to manufacture the first wind turbine blade shell half. In some prior art systems, shell halves are combined into a shell in an intermediate step in which they are moved from moulds to supports in the system used for assembling the shell halves. Instead, by moulding the first shell half in the assembly system, the shell half does not need to be moved after manufacturing in order to assemble the shell halves. This saves the intermediate supports and the work associated with moving shell halves from the moulds to the intermediate supports.

In some embodiments, the moveable portion comprises a first mould having a first mould layup surface for manufacturing the first wind turbine blade shell half, and in addition, the second support structure comprises a second mould having a second mould layup surface for manufacturing the second wind turbine blade shell half. This saves the entire intermediate step of moving shell halves from moulds to a separate assembly system. Accordingly, a separate assembly system is not needed.

In some embodiments, the system comprises a working platform that allows personnel to add material, such as fibre material, to the first layup surface of the first mould.

In some embodiments, the stationary portion of the first support structure comprises holding means that support the working platform. The working platforms help personnel lay up the necessary parts and to arrange for infusion of resin.

Even if a platform is provided with current systems for assembling shell halves, the platforms must be moved out of the way before the shell halves can be assembled, since the entire support for one of the shell halves is moved, which will interfere with the working platform. In some embodiments of the present invention, the system, including the moveable portion, the stationary portion, and the working platform, are configured such that the working platform is arranged so it does not interfere with the moveable portion while the moving means move the moveable portion from the first position to the second position in order to assemble the shell halves. In a different formulation, the stationary portion, the moveable portion, and the working platform are designed and arranged such that the moveable portion can move without interfering with the working platform. This eliminates the need to move the working platform away in order to be able to combine shell halves. The separation of the first support structure into two portions makes this possible.

In some embodiments, the moving means comprises pivoting means arranged between the first support structure and the second support structure, the pivoting means being configured to pivot the moveable portion around at least a first axis. Furthermore, the first support structure and the second support structure are arranged such that pivoting the moveable portion around at least the first axis from the first position by a predetermined amount assembles the first wind turbine blade shell half with the second wind turbine blade shell half, thereby forming the wind turbine blade shell.

In some embodiments, the moving means comprises pivoting means arranged between the first support structure and the second support structure and being configured to pivot the moveable portion around at least a first axis, the first support structure and the second support structure being arranged such that after pivoting the moveable portion around at least the first axis from the first position by a predetermined amount, the moveable portion is positioned in a third position above the second support structure, and one or more adjustment means are configured to cause the first wind turbine blade shell half to be assembled with the second wind turbine blade shell half. For instance, it may cause the moveable portion to move from the third position to the second position by a substantially vertical downward movement. Alternatively, the adjustment means may support the blade only and provide a downward movement of the first shell half while the moveable portion of the first support structure remains in a position above the second support structure. Such adjustment means may allow for better control when finally assembling the shell halves. In some embodiments, the adjustment means comprises a plurality of individually moveable adjustment means. This allows even finer control in the final stages of assembling the shell halves. In some embodiments, the moving means comprise adjustment means that allow a downward movement of the moveable portion.

In some embodiments, the stationary portion is adapted to support the moveable portion in its first position. Thus, when the first shell half is supported by the moveable portion above the stationary portion in the moveable portion's first position, there is no need to actively hold the moveable portion in place, for instance using the moving means. Instead, or in addition, it can rest on the stationary portion. This increases personnel safety.

In some embodiments, the system further comprises securing means for securing the first wind turbine blade shell half to the moveable portion while the moveable portion is moved from the first position to the second position. Although the shell half may already be held firmly by the moveable portion, additional securing further reduces the risk that the first shell half leaves the moveable portion inadvertently. This increases personnel safety. Even if precautionary measures are being taken by evacuating personnel from the vicinity of the system before moving the first shell half, losing a shell half is very likely to cause damage to the shell half and/or to the supports and/or to the moving means, and possibly to other property. The securing means reduces the risk of this happening.

A second aspect of the invention provides a method for assembling a wind turbine blade shell. The method comprises:

proviiding a first support structure and a second support structure, the first support structure comprising a stationary portion and a moveable portion, the moveable portion being adapted to support a first wind turbine shell half, the second support structure being adapted to support a second wind turbine blade shell half, the moveable portion being attached to moving means configured to move the moveable portion between:

i. a first position in which the moveable portion is positioned above the stationary structure, and ii. a second position in which the moveable portion is positioned above the second support structure, wherein when the moveable portion is in the second position, the first wind turbine blade shell half, when supported by the moveable portion, and the second wind turbine blade shell half, when supported by the second support structure, are assembled, forming the wind turbine blade shell, the moving from the first position to the second position comprising at least a pivoting of the moveable portion around at least a first axis, providing the first wind turbine shell half on the moveable portion and providing the second wind turbine shell half on the second support structure, moving, using the moving means, the moveable portion from the first position to the second position, whereby the first wind turbine blade shell half and the second wind turbine blade shell half are assembled, forming the wind turbine blade shell.

The method provides the advantages described in relation to the first aspect of the invention.

In some embodiments of the method, the moveable portion comprises a first mould for manufacturing the first wind turbine blade shell half, and the step of providing the first wind turbine blade shell half on the moveable portion comprises:

providing a wind turbine blade layup on a layup surface of the first mould, including fibre material, infusing resin into the fibre material, curing the resin.

This allows the first shell half to be manufactured directly within the system, eliminating the need for a separate mould station for manufacturing the first wind turbine blade shell half.

In some embodiments, the second support structure comprises a second mould for manufacturing the second wind turbine blade shell half, and the step of providing the second wind turbine blade shell half on the second support structure comprises:

providing a wind turbine blade layup on a layup surface of the second mould, including fibre material, infusing resin into the fibre material, curing the resin.

When both shell halves are manufactured in place, there is no need at all for moving the shell halves in order to assemble them. Thus, the need for an intermediate assembly system is eliminated. The same system can be used for manufacturing the shell halves and for assembling them.

In some embodiments, the method is carried out while a working platform is arranged in the vicinity in such a way that:

i. personnel can add material to the layup surface of the first mould, and ii. the working platform does not interfere with the moveable portion while the moveable portion is moved by the moving means from the first position to the second position.

As described in relation to the first aspect of the invention, this eliminates the step of moving working platforms away from the first support structure in order to be able to assemble the shell halves.

BRIEF DESCRIPTION OF THE DRAWINGS

The invention is explained in detail below with reference to embodiments shown in the drawings.

DETAILED DESCRIPTION OF SELECTED EMBODIMENTS

In the following, selected embodiments of the invention are described with reference to the drawings. The examples shall not to be construed as limiting the scope of protection as defined by the claims. The drawings are not necessarily drawn to scale and dimensions and proportions shall not be construed as limiting, unless otherwise indicated.

Figure 1:
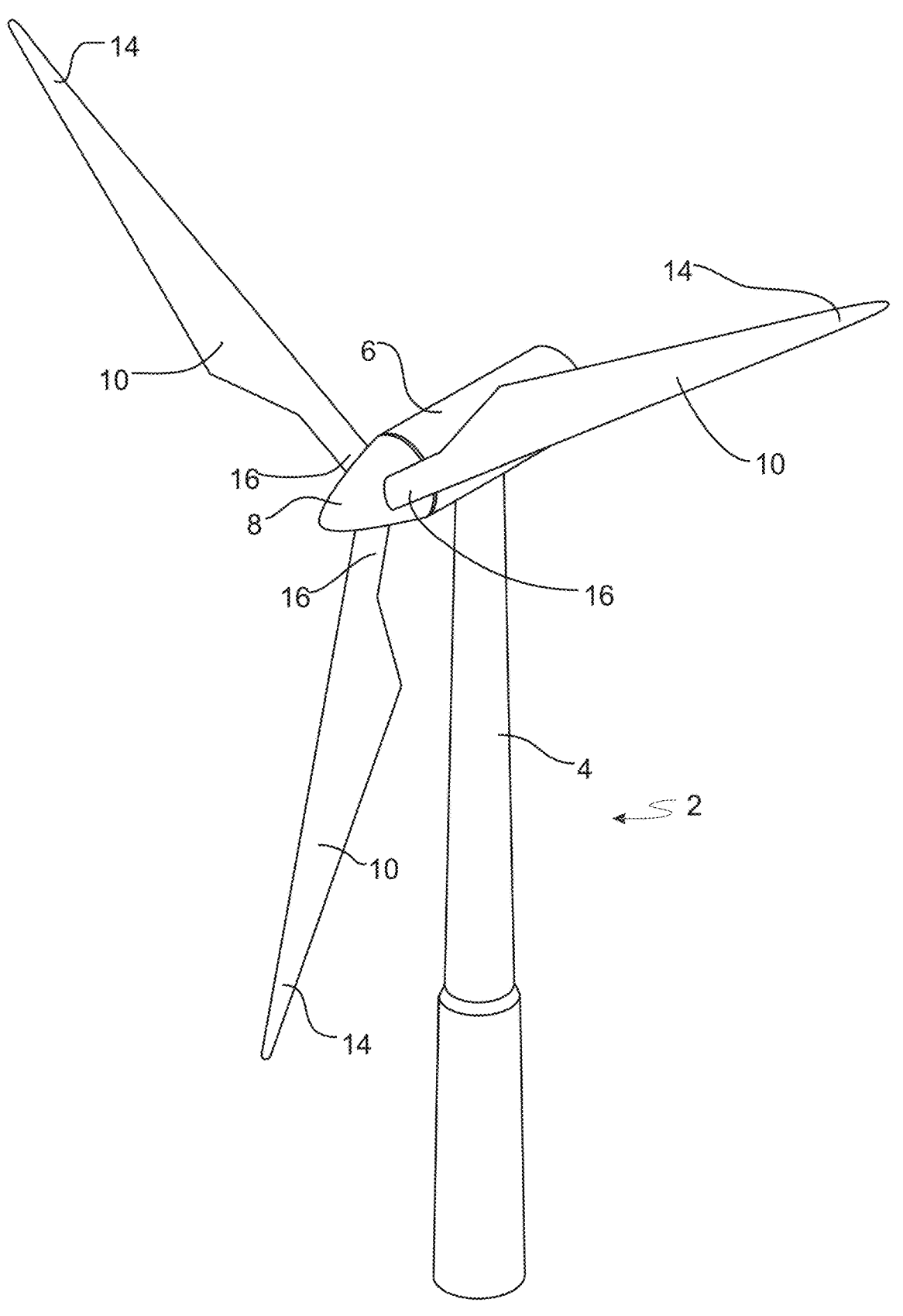
FIG. 1 is a schematic view of a wind turbine.

FIG. 1 illustrates a conventional modern wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
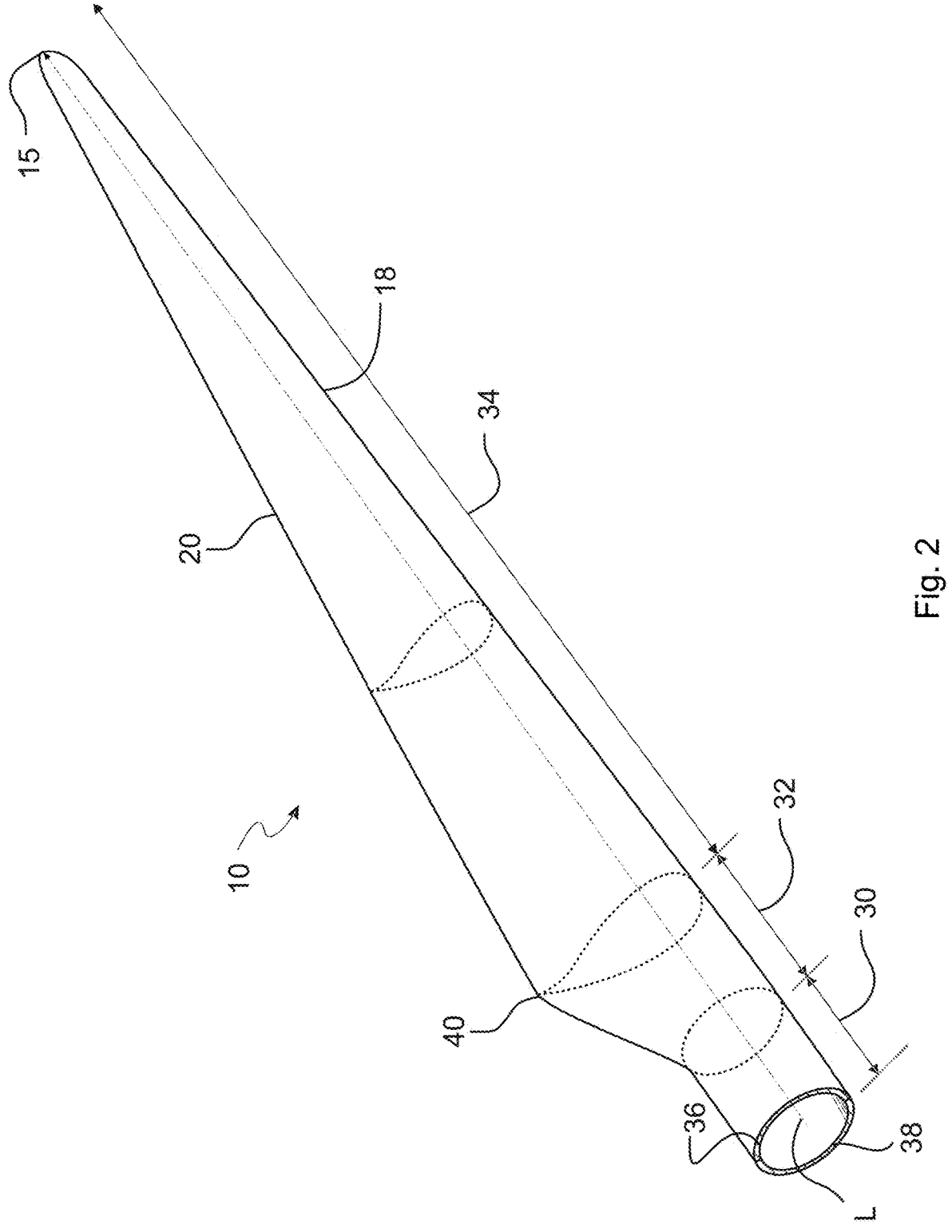
FIG. 2 is a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The outermost point of the blade 10 is the tip end 15. The blade 10 comprises a pressure side shell half 36 and a suction side shell half 38. Together, they form the shell of the wind turbine blade 10.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may for instance be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position where the blade 10 has its largest chord length. The shoulder 40 is typically provided at the boundary between the transition region 32 and the airfoil region 34. FIG. 2 also illustrates the longitudinal extent Z of the blade.

Figure 3A:
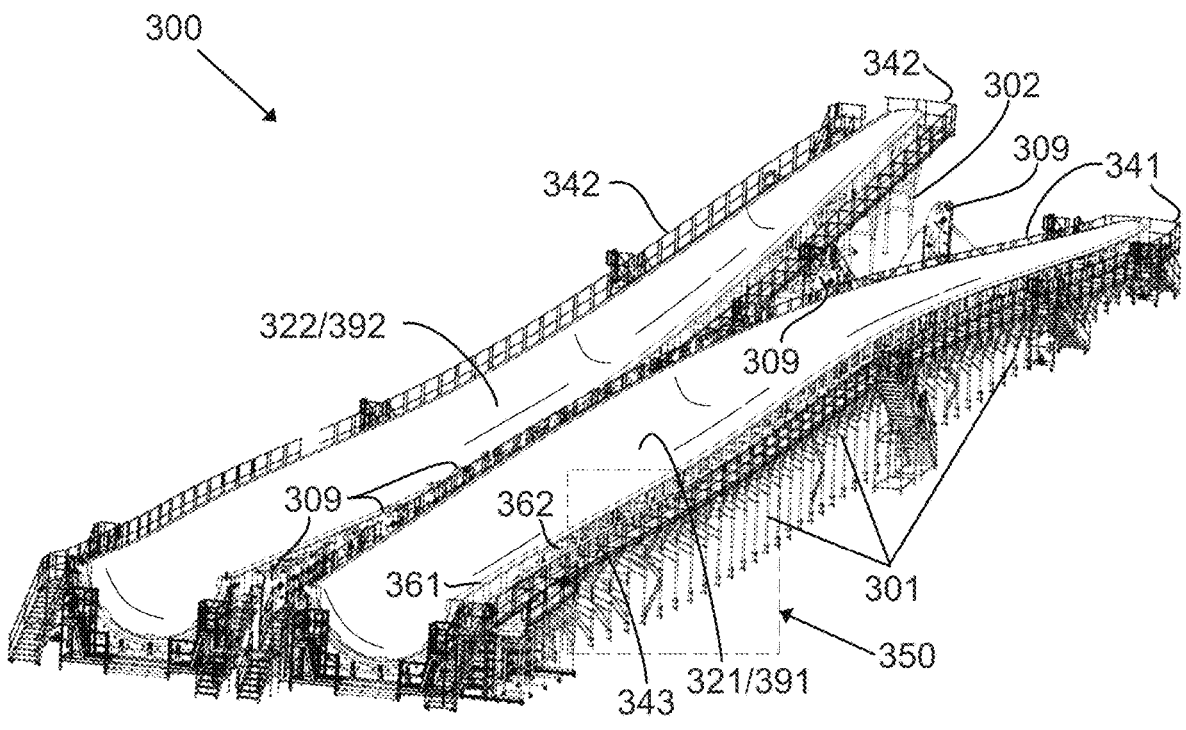
FIG. 3A illustrates a system in accordance with an embodiment of the invention for assembling a wind turbine blade shell.

FIG. 3A illustrates a system 300 in accordance with an embodiment of the first aspect of the invention. The system comprises a first support structure comprising a stationary portion 301, which in this example is scaffolding-like, including elements such as standards, rails, ledgers, and braces. The detailed structure of the stationary portion is not essential. The system further comprises a moveable portion arranged above and on the stationary portion 301. In this example, the moveable portion comprises a first mould 391 for laying up a pressure side blade shell half for manufacturing a pressure side blade shell half or for supporting a premanufactured pressure side blade shell half. The first mould and its mould surface will both be referred to using reference 391 in the following. In the present example, the first mould 391 allows infusion of resin into fibre material arranged on the first mould surface 391.

The first mould comprises a mould flange 361 that may support fibre material during a resin infusion manufacturing process performed at the first mould 391. Resin infusion requires provision of resin, a vacuum bag, and evacuation means. This is known in the art and will not be described in further detail. The mould flange 361 can be used to further secure the pressure side shell half to the moveable portion, for instance using clamping means.

As part of the moveable portion, the first mould 391 in this example is supported by a scaffolding-like structure 362 including supporting elements such as standards, rails, ledgers, and braces.

The system furthermore comprises a second support structure 302 including a second mould 392 having a second mould surface for laying up a suction side blade shell half for manufacturing a suction side blade shell half or for supporting a premanufactured suction side blade shell half. The second mould and the second mould surface will both be referred to using reference 392. Like the first mould 391, the second mould 392 is configured to allow subsequent resin infusion in order to manufacture a fibre-reinforced blade shell half.

The moveable portion may instead be adapted for the suction side shell half and the second support structure for the pressure side shell half. In the present example, the moveable portion is for supporting the pressure side shell half.

In FIG. 3A, the shell-half shaped "surfaces" indicated by 391 and 392 may as well represent wind turbine blade shell halves, 321 and 322, that have been manufactured either on the surfaces 391 and 392 or at a separate manufacturing station and moved to the surfaces. Therefore, FIG. 3A indicates both references 321 and 322 for the shell halves as such, and references 391 and 392 for the surfaces of the respective moulds. References 391 and 392 are also used for the respective moulds, as described above.

Layup for the blade shell halves requires personnel to be able to access the blade moulds, and due to the large size of blades, many of which exceed 100 meters in length, a working platform is required, as also discussed above. In the present example, as illustrated in FIG. 3A, the system comprises a working platform, including for instance walkways 343 and guard rail 341, allowing personnel to work at the moulds. A working platform is also arranged around the suction side mould, as shown in FIG. 3A and indicated by guard rail 342.

Figure 3B:
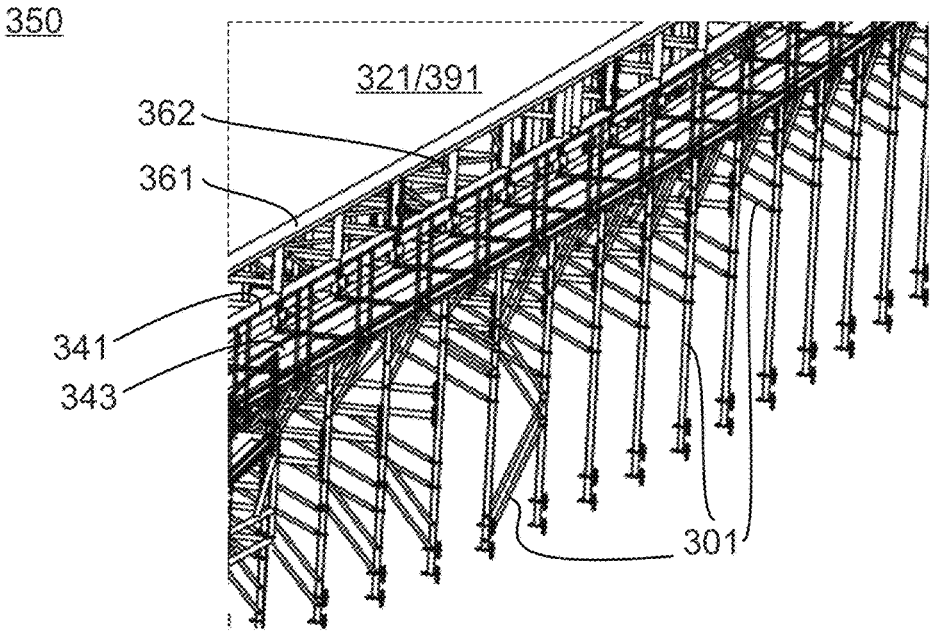
FIG. 3B illustrates a detail from the system illustrated in FIG. 3A.

FIG. 3B illustrates the portion 350 in more detail, showing moveable portion ledgers 362 and mould flange 361. The mould 391 and support structure 362 are part of the moveable portion that is moveable between a first position and in a second position. FIG. 3A illustrates the moveable part in the first position, in which it is supported by the stationary portion 301.

The moveable portion may be releasably attached to the stationary portion to increase safety.

The system further comprises moving means 309 attached to the moveable portion to move the moveable portion from the first position to a second position. When the moveable portion is in the second position, the pressure side shell half and the suction side shell half are in the assembled state.

Figure 3C:
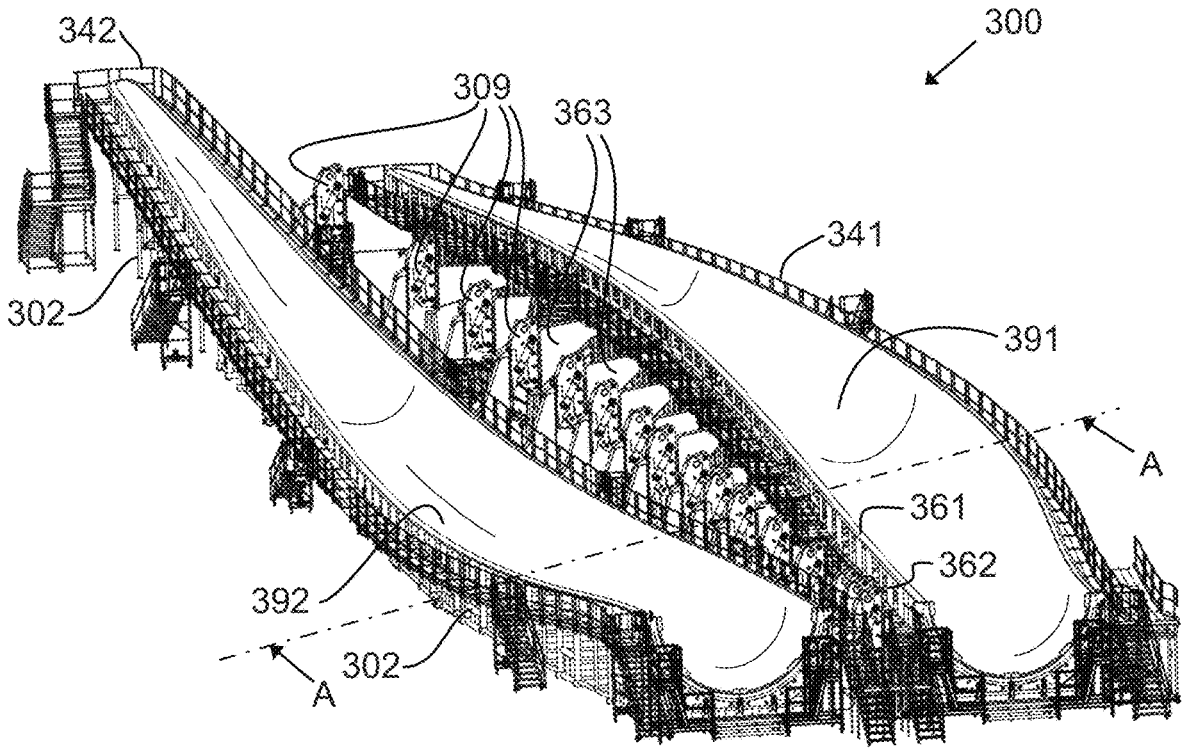
FIG. 3C illustrates the system shown in FIG. 3A from a different perspective.
Figure 6A:
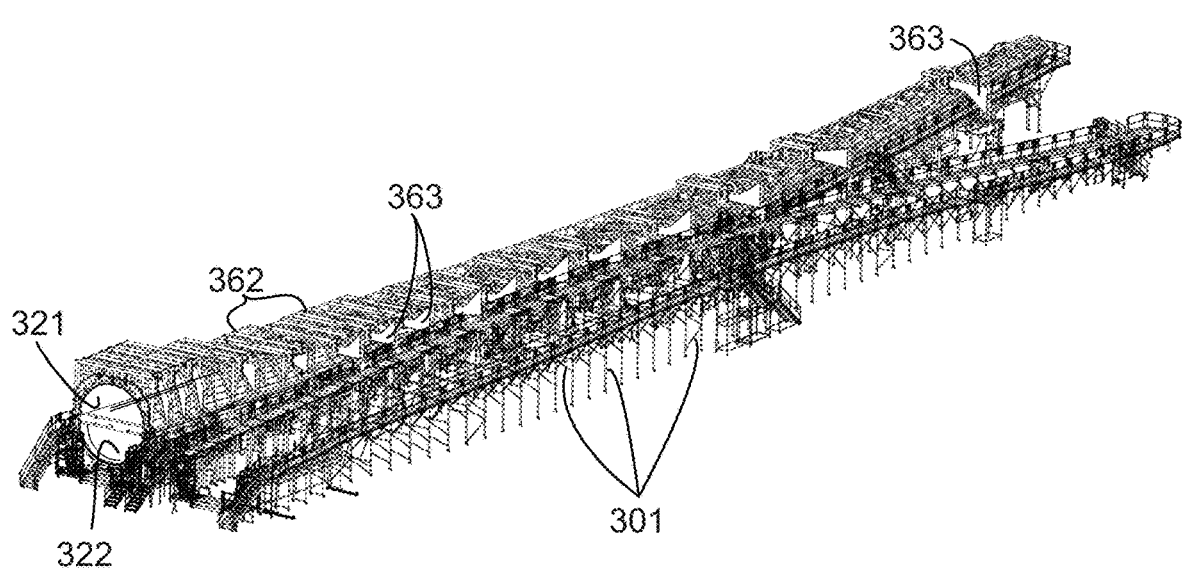
FIG. 6A illustrates the system of FIG. 3A in a closed configuration.
Figure 6B:
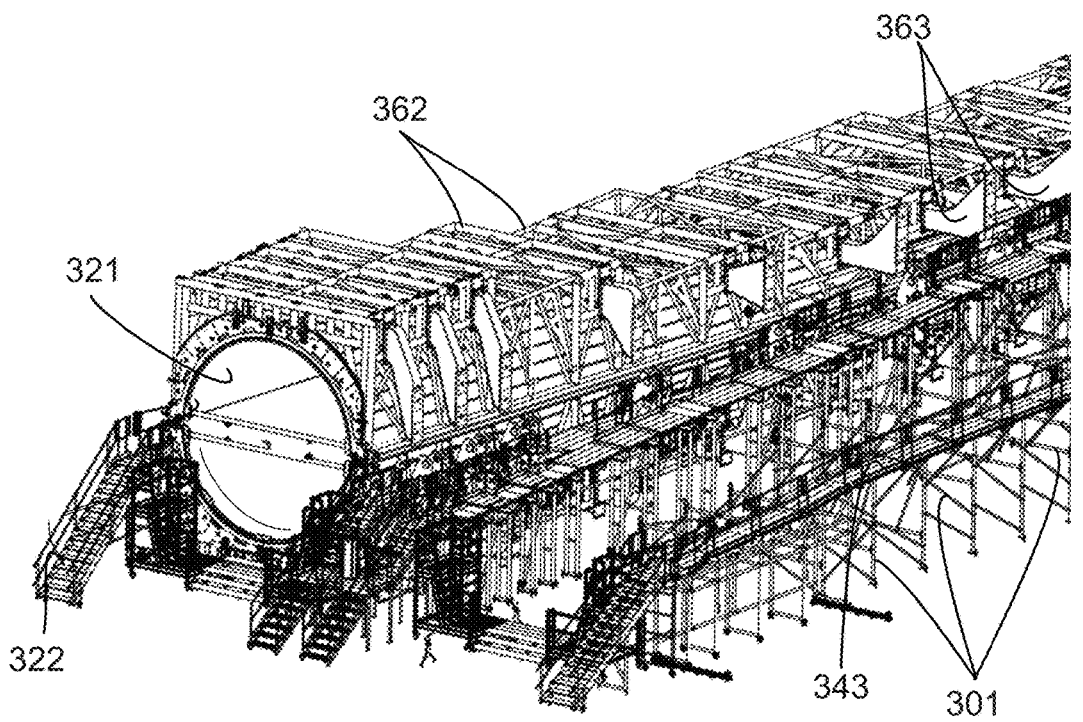
FIG. 6B illustrates a detail from the system illustrated in FIG. 6A.

FIG. 3C illustrates the system 300 from a different perspective. The moving means 309 are clearly visible. They may include turning hinges that can assist in turning the moveable portion. Furthermore, FIG. 3C also illustrates connection beams 363 that are part of the moveable portion of the first support structure. The connection beams are connected to the moving means 309 and allow the moving means 309 to pivot the moveable portion from the first position to the second position. The second position of the moveable portion, where the shell halves are assembled, is shown in FIGS. 6A-6B, which are described in more detail below.

As described above, the system has the advantage that wind turbine blade shell halves can be manufactured and assembled into a shell without having to move blade shell halves. Furthermore, by using a first support structure that is made of a moveable portion and a stationary portion that are easily separated from one another, the load on the moving means 309 is significantly reduced. Furthermore, with some modification, the stationary portion can relatively easily be reused for other moulds, as long as the moveable portion comprising the mould can be secured to the stationary portion 301.

FIGS. 4A-4F schematically illustrate a process for manufacturing a wind turbine blade shell 10 with reference to cross-section A-A indicated in FIG. 3C.

Figure 4A:
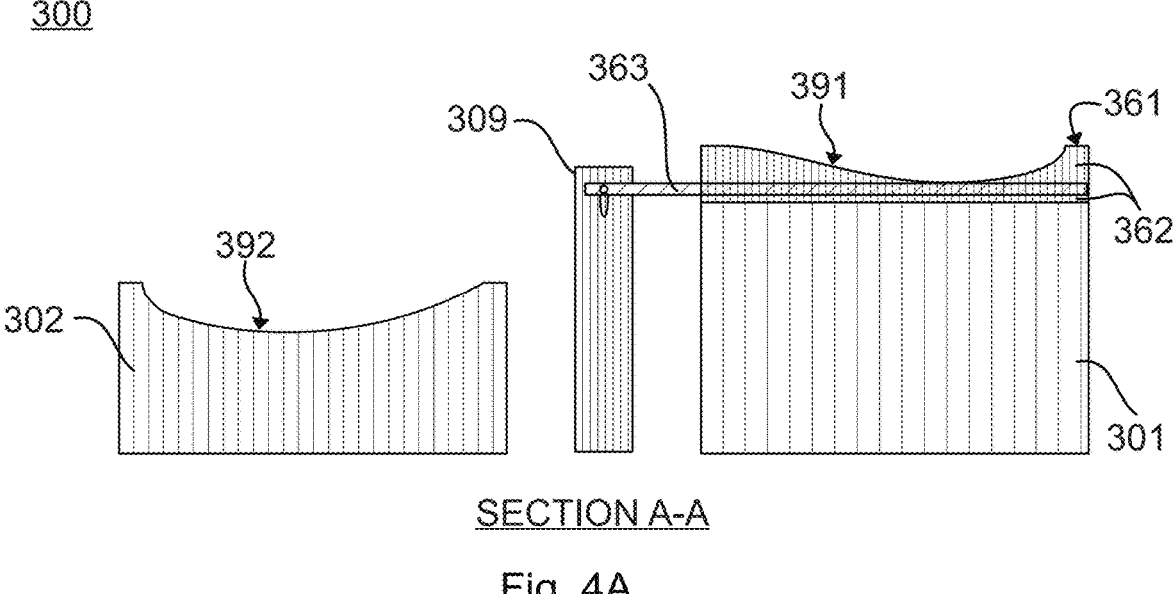
FIGS. 4A-4F illustrate a method for assembling a wind turbine blade shell.

FIG. 4A schematically illustrates the system 300 in the section A-A indicated in FIG. 3C. As described above, the system includes a stationary portion 301 that supports a moveable portion comprising for instance a support structure 362, a mould flange 361, and connection beams 363. The connection beams 363 are connected to the moving means 309. The moving means 309 allows the moveable portion to be pivoted to a position above the second support structure 302.

The moveable portion has a mould surface 391 for laying up a blade layup.

FIG. 4A also illustrates the second support structure. It has a mould surface 392 for laying up fibre material and other materials for manufacturing the suction side wind turbine blade shell half.

Figure 4B:
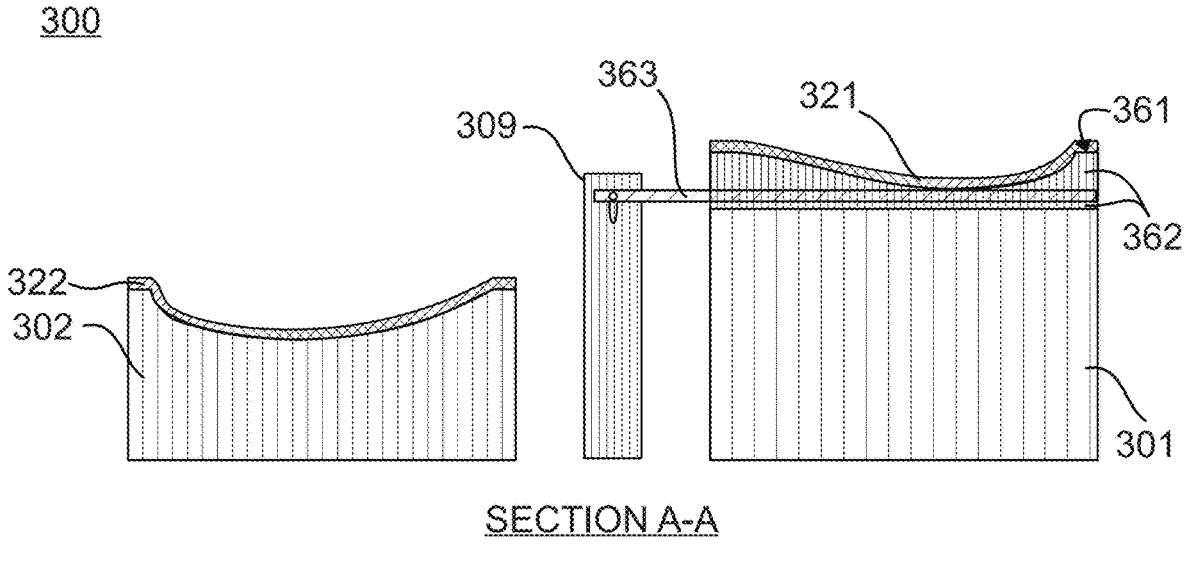

FIG. 4B illustrates a pressure side blade shell half 321 manufactured on the mould surface 391 by laying up fibre material and other materials and infusing the materials with resin, for instance by a vacuum-assisted resin transfer moulding process. A corresponding suction side shell half 322 has been manufactured on the mould surface 392. The moveable portion is in the first position.

Figures 4C, 4D:
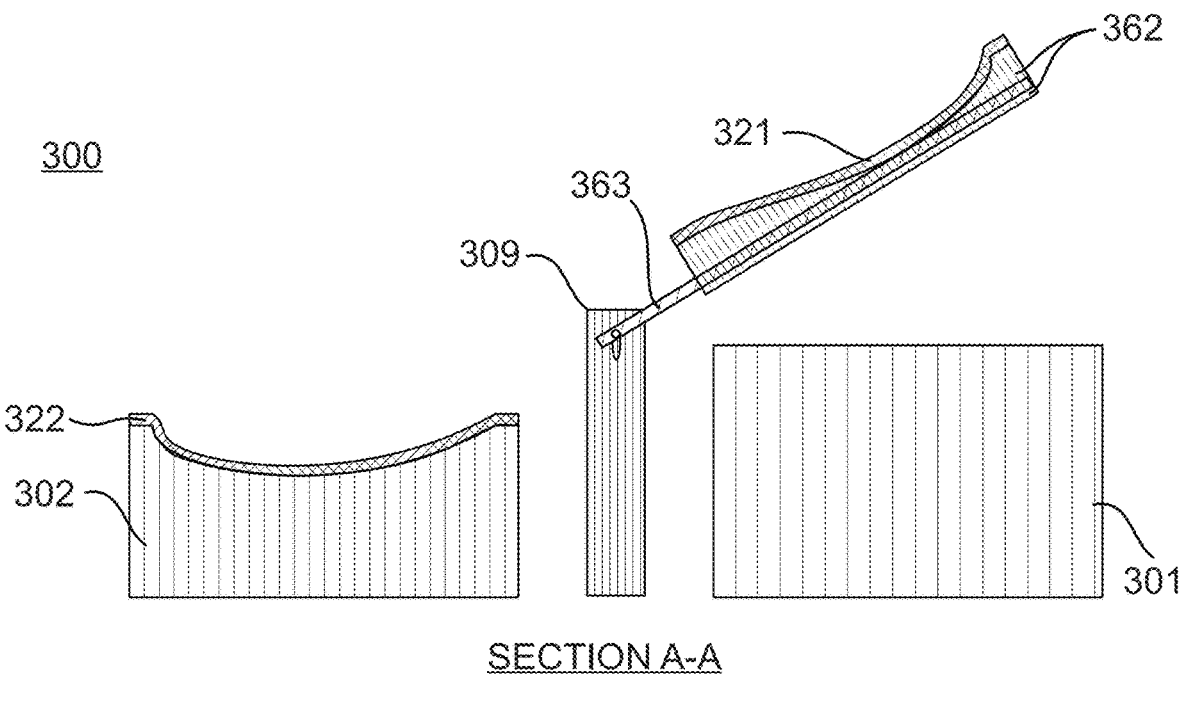

FIG. 4C illustrates the moving means 309 pivoting the moveable portion with the pressure side shell half 321 away from the stationary portion 301, towards the suction side shell half 322. By virtue of the separation of the first support structure into a moveable portion and a stationary portion, the mass to be moved when assembling the pressure side shell half 321 and the suction side shell half 322 is significantly reduced, as described above and illustrated in FIG. 4C, which clearly shows the stationary portion 310 remaining in place during assembly of the shell.

Figure 4E:
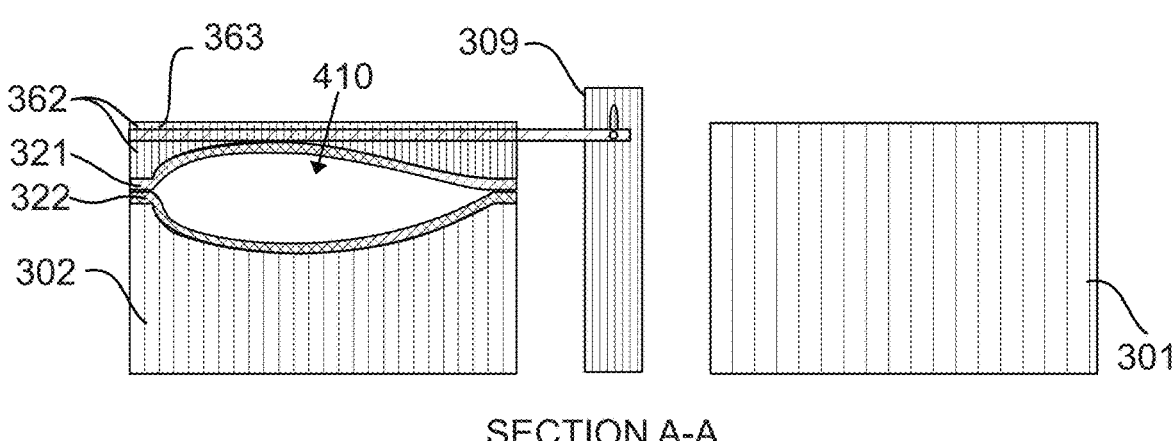

FIG. 4D illustrates the moveable portion with the pressure side shell half 321 in a third position which is above the suction side shell half 322, almost assembled with the suction side shell half 322. From there, as illustrated in FIG. 4E, the moving means 309 provides an essentially vertical movement of the moveable portion into a second position in which the pressure side shell half 321 and the suction side shell half 322 are in an assembled state, resulting in a complete blade shell 410.

Figure 4F:
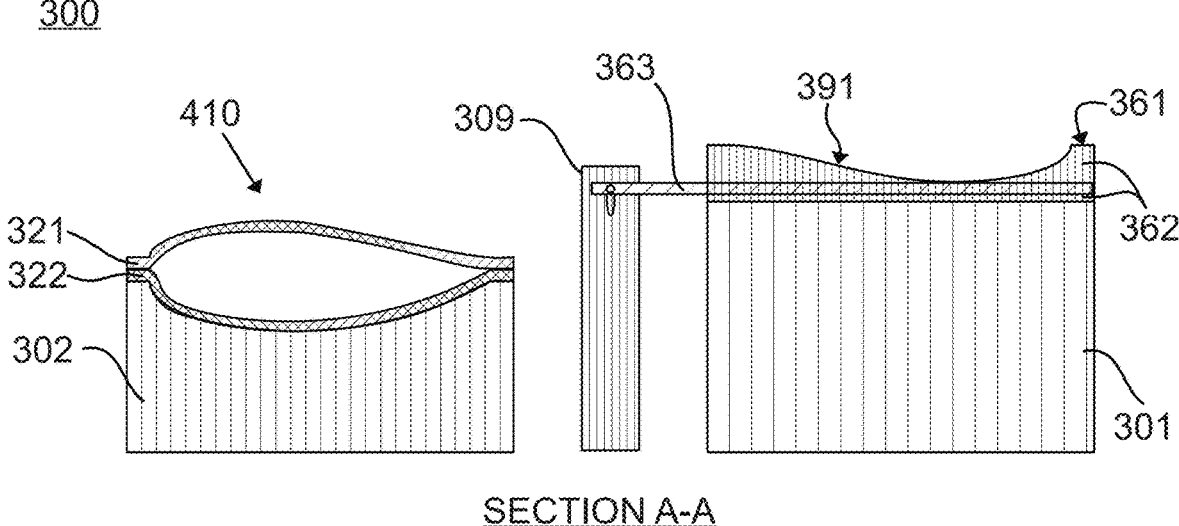

FIG. 4F illustrates the moveable portion of the first support structure having been moved back to the first position, above the stationary portion 301. The blade shell 410 can be removed from the second support structure 302, and the system 300 is then ready for manufacture of another wind turbine blade shell 410 via the steps illustrated in FIGS. 4A-4E.

Figure 5A:
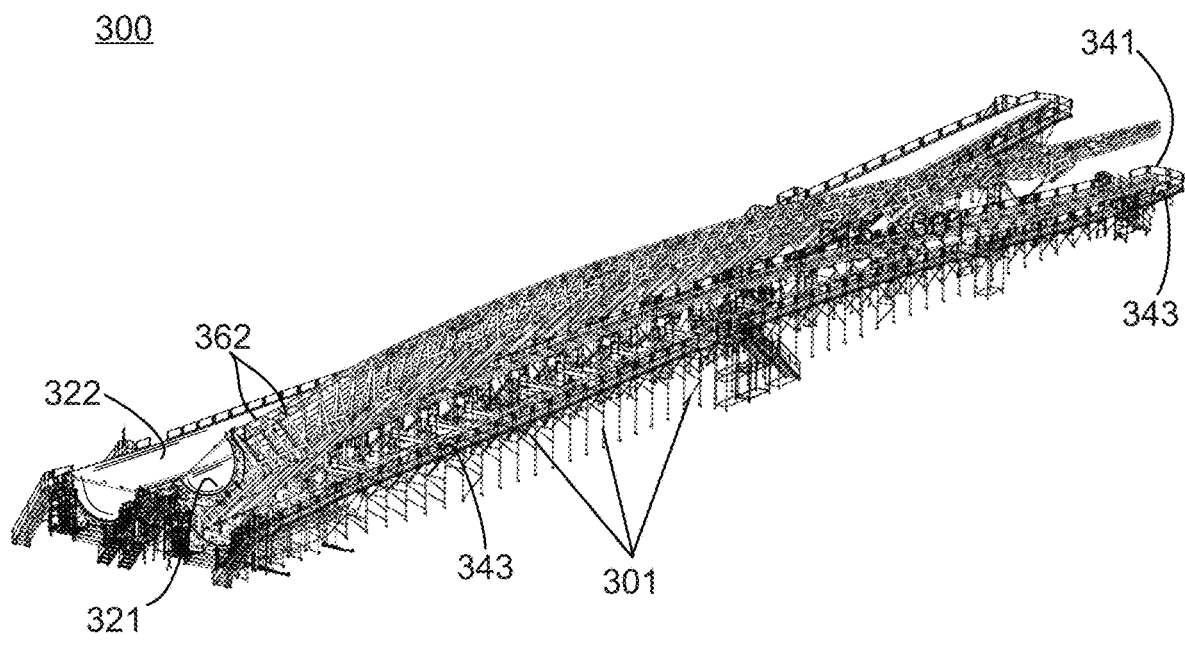
FIG. 5A illustrates the system of FIG. 3A in a semi-closed configuration.

FIG. 5A illustrates a perspective view of the system 300 in the state illustrated in FIG. 4C. As described above, the stationary portion 301 remains in place while the moveable portion, including structure 362 and connection beams 363, is moved. In FIG. 5A, the moveable portion supports a pressure side shell half 321 in a position between the first position, shown in FIG. 4A, and the second position, shown in FIG. 4E, in which the pressure side shell half and suction side shell half are assembled and form a complete blade shell.

FIG. 5A further illustrates another advantage of the invention. Layup for the blade shell halves requires personnel to be able to access the blade mould, and due to the large size of blades, many of which exceed 100 meters in length, a working platform is required, as also discussed above. As seen in FIG. 5A, the moveable portion containing the pressure side shell half 321, can be pivoted while the working platform, including for instance walkways 343 and guard rail 341, remains in place. In current systems, working platforms must be moved out of the way to allow the entire support structure to be moved to assemble the pressure and suction side shell halves. By being able to leave the working platform to remain in place, time is saved, allowing a higher throughput.

Figure 5B:
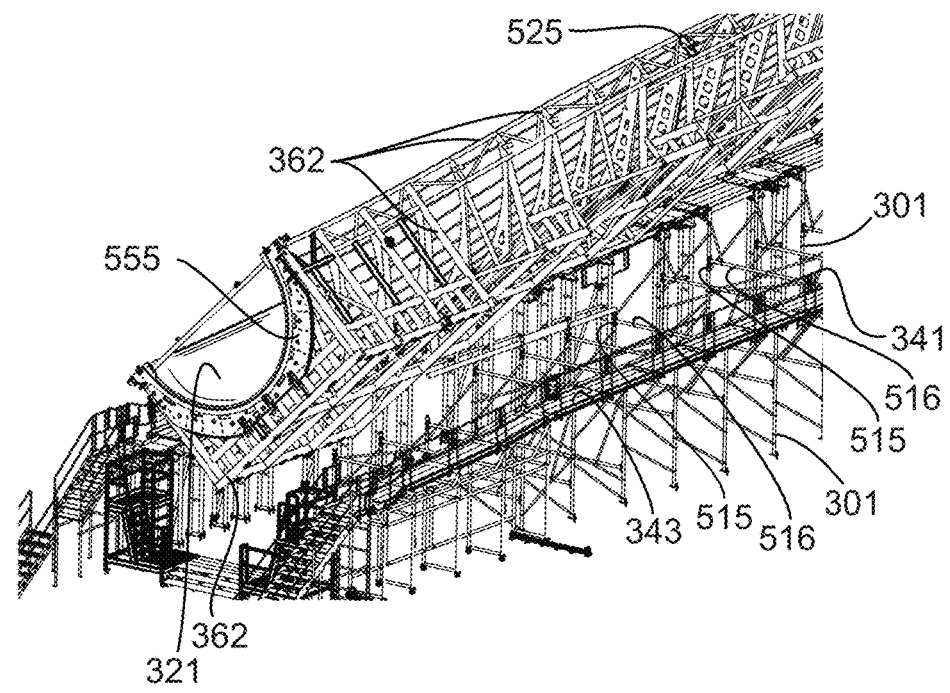
FIG. 5B illustrates a detail from the system illustrated in FIG. 5A.

FIG. 5B illustrates a detail of the system 300 in the configuration shown in FIG. 5A. FIG. 5B illustrates support structure standards 362 and the connection beams 363 in more detail. FIG. 5B also illustrates a pressure side shell half root plate 555 for mounting the pressure side shell half on the wind turbine hub, although ultimately as part of the assembled blade. FIG. 5B further illustrates the guard rail 341, working platform 343, and support structure 301 remaining in place while the pressure side shell half 321 is moved.

FIG. 5B also illustrates holding means 515, such as hinges, on the stationary portion 301 in accordance with an embodiment of the invention. The holding means hold the working platform 343 in place on the stationary portion 301, for instance using the illustrated ledgers 516 that secure the walkways 343 to the stationary portion 301. As can be seen from FIG. 5B, the hinges 515, ledgers 516, and walkways 343 are arranged such that the moveable portion can be moved without interfering with the working platform, as described above. As described above, in current systems, where the first support structure is not divided into two portions, working platforms have to be removed before pivoting the pressure side shell half, which requires additional time. The embodiment can therefore lead to reduced turnaround times compared to existing systems.

FIG. 5B further illustrates one of a plurality of adjustment guides 525 configured to guide the pressure side shell half 321 from the position illustrated in FIG. 4D to the assembled position illustrated in FIG. 4E, leading to final assembly of the first and second wind turbine blade shell halves, thereby forming the wind turbine blade shell. The adjustment guides 525, such as hydraulic jacks, provide a mostly vertical displacement of the moveable portion including the pressure side shell half, but in some embodiments also a lateral movement of the moveable portion.

FIG. 6A is a perspective view of the system 300 in a closed state, in which the pressure side shell half 321 has been assembled with the suction side shell half 322, forming the complete blade shell. Before assembling the shell halves, adhesive is added (not shown) along the trailing edge and the leading edges of the shell halves, as is well known when forming a blade shell from two shell halves. In FIG. 6A, the stationary portion 301 of the first support structure, the support structure 362, and connection beams 363 are also indicated. As is seen, the stationary portion of the first support structure remains in place while the moveable portion is being moved, which reduces the weight to be moved when assembling the blade shell by pivoting the pressure side shell half 321 (or suction side shell half, as the case may be if the system is configured with the suction side support as part of the moveable portion). As also described above and shown in FIG. 6A, the working platform can remain in place, whereas in present systems, the working platform has to be moved out of the way before the pressure side shell half can be moved, which is time-consuming.

FIG. 6B illustrates part of the view in FIG. 6A in more detail, showing the assembled pressure side shell half 321 and suction side shell half 322, the stationary portion 301, support structure standards and ledgers 362, connection beams 363, as well as the walkways 343 of the working platform remaining in place because the division of the first support structure allows for it, as described above.

LIST OF REFERENCE NUMERALS

2: wind turbine
4: tower
6: nacelle
8: hub
10: blades
14: blade tip
15: tip end
16: blade root
18: leading edge
trailing edge
30: root region
32: transition region 34: airfoil region
36: pressure side shell half
38: suction side shell half
40: blade shoulder
300 blade shell provision system
301 first support structure standards, braces
302 second support structure
309 moving means, turning hinges
321 pressure side blade shell half
322 suction side blade shell half
341 guard rail
342 guard rail
343 pressure side blade shell half working platform walkway
350 detail of first support structure stationary portion and moveable portion
361 mould flange
362 moveable portion structure
363 connection beam
391 first mould surface
392 second mould surface
410 blade shell
515 working platform hinges
516 working platform fasteners
525 adjustment means
555 pressure side root plate
L longitudinal extent of the blade

The invention claimed is:

1. A system for assembling a wind turbine blade shell, the system comprising: a first support structure comprising a stationary portion and a moveable portion, the moveable portion being adapted to support a first wind turbine blade shell half, wherein a height of the stationary portion is greater than a height of the moveable portion, wherein the moveable portion comprises a first mould having a first mould layup surface; a second support structure adapted to support a second wind turbine blade shell half; and moving means attached to the moveable portion and configured to move the moveable portion between: a first position in which the moveable portion is positioned above the stationary portion, and a second position in which the moveable portion is positioned above the second support structure, wherein when the moveable portion is in the second position, the first wind turbine blade shell half, when supported by the moveable portion, and the second wind turbine blade shell half, when supported by the second support structure, are assembled, forming the wind turbine blade shell, wherein the moving means comprises pivoting means arranged between the first support structure and the second support structure and being configured to pivot the moveable portion around at least a first axis, the first support structure and the second support structure being arranged such that pivoting the moveable portion around at least the first axis from the first position by a predetermined amount assembles the first wind turbine blade shell half with the second wind turbine blade shell half, thereby forming the wind turbine blade shell, and wherein the first axis is located at a height exceeding a height of the stationary portion of the first support structure, the system further comprising a working platform configured to allow personnel to add material to the first layup surface of the first mould, wherein the stationary portion comprises holding means for supporting the working platform, wherein the holding means comprise one or more hinges connected to one or more working platform fasteners located between the working platform and the stationary portion, and wherein the working platform does not interfere with the moveable portion while the moving means move the moveable portion from the first position to the second position.

2. The system in accordance with claim 1, wherein the first mould with the first mould layup surface is configured for manufacturing the first wind turbine blade shell half.

3. The system in accordance with claim 1, wherein the first mould with the first mould layup surface is configured for manufacturing the first wind turbine blade shell half and the second support structure comprises a second mould having a second mould layup surface for manufacturing the second wind turbine blade shell half.

4. The system in accordance with claim 1, wherein the first support structure and the second support structure are arranged such that after pivoting the moveable portion around at least the first axis from the first position by the predetermined amount, the moveable portion is positioned in a third position above the second support structure, the moving means further comprising one or more adjustment means configured to cause the first wind turbine blade shell half to be assembled with the second wind turbine blade shell half, thereby forming the wind turbine blade shell.

5. The system in accordance with claim 4, wherein the adjustment means comprises a plurality of individually moveable adjustment means.

6. The system in accordance with claim 1, wherein the stationary portion is adapted to support the moveable portion in its first position.

7. The system in accordance with claim 1, further comprising securing means for securing the first wind turbine blade shell half to the moveable portion while the moveable portion is moved from the first position to the second position.

8. A method for assembling a wind turbine blade shell, comprising: providing a first support structure and a second support structure, the first support structure comprising a stationary portion and a moveable portion, wherein a height of the stationary portion is greater than a height of the moveable portion, the moveable portion being adapted to support a first wind turbine shell half, the second support structure being adapted to support a second wind turbine blade shell half, the moveable portion comprising a first mould having a first mould layup surface, the moveable portion being attached to moving means configured to move the moveable portion between: a first position in which the moveable portion is positioned above the stationary portion, and a second position in which the moveable portion is positioned above the second support structure, wherein when the moveable portion is in the second position, the first wind turbine blade shell half, when supported by the moveable portion, and the second wind turbine blade shell half, when supported by the second support structure, are assembled, forming the wind turbine blade shell, the moving from the first position to the second position comprising at least a pivoting of the moveable portion around at least a first axis, providing the first wind turbine shell half on the moveable portion and providing the second wind turbine shell half on the second support structure, providing a working platform configured to allow personnel to add material to the first layup surface of the first mould, wherein the stationary portion comprises holding means for supporting the working platform, wherein the holding means comprise one or more hinges connected to one or more working platform fasteners located between the working platform and the stationary portion, moving, using the moving means, the moveable portion from the first position to the second position, whereby the first wind turbine blade shell half and the second wind turbine blade shell half are assembled, forming the wind turbine blade shell, wherein the working platform does not interfere with the moveable portion while the moving means move the moveable portion from the first position to the second position, wherein the moving means comprises pivoting means arranged between the first support structure and the second support structure and being configured to pivot the moveable portion around at least a first axis, the first support structure and the second support structure being arranged such that pivoting the moveable portion around at least the first axis from the first position by a predetermined amount assembles the first wind turbine blade shell half with the second wind turbine blade shell half, thereby forming the wind turbine blade shell, and wherein the first axis is located at a height exceeding a height of the stationary portion of the first support structure.

9. The method in accordance with claim 8, wherein the first mould is configured for manufacturing the first wind turbine blade shell half, and wherein the step of providing the first wind turbine blade shell half on the moveable portion comprises:

providing a wind turbine blade layup on a layup surface of the first mould, including fibre material;

infusing resin into the fibre material; and curing the resin.

10. The method in accordance with claim 8, wherein the second support structure comprises a second mould for manufacturing the second wind turbine blade shell half, and wherein the step of providing the second wind turbine blade shell half on the second support structure comprises:

providing a wind turbine blade layup on a layup surface of the second mould, including fibre material;

infusing resin into the fibre material; and curing the resin.

* * * * *